United States Patent [19]

Snyder et al.

[11] Patent Number: 4,576,339

[45] Date of Patent: Mar. 18, 1986

[54] SCRAP TIRE CUTTING APPARATUS

[75] Inventors: Robert H. Snyder, Grosse Pointe Park; Eric O. Tolonen, Gladwin, both of Mich.

[73] Assignee: Uniroyal, Inc., Middlebury, Conn.

[21] Appl. No.: 493,400

[22] Filed: May 10, 1983

[51] Int. Cl.⁴ .............................................. B02C 4/00
[52] U.S. Cl. .................................... 241/120; 241/121; 241/230; 241/DIG. 31
[58] Field of Search .................... 241/99, 80, 97, 111, 241/112, 120, 121, 230–236, DIG. 31, 166, 167; 72/203, 244, 241

[56] References Cited

U.S. PATENT DOCUMENTS

| | | |
|---|---|---|
| 202,553 | 4/1878 | Knoth . |
| 1,183,573 | 5/1916 | Le Page . |
| 1,183,574 | 5/1916 | Le Page . |
| 1,598,364 | 8/1926 | Cassell et al. .................. 241/230 X |
| 2,121,453 | 6/1938 | Sundstrand . |
| 2,370,129 | 2/1945 | Asbill, Jr. et al. . |
| 3,039,704 | 6/1962 | Goto ................................ 241/235 X |
| 3,578,252 | 5/1971 | Brewer .............................. 241/141 |
| 3,630,460 | 12/1971 | Goldhammer ..................... 241/236 |
| 3,656,697 | 4/1972 | Nelson .............................. 241/222 |
| 3,727,850 | 4/1973 | Krigbaum .......................... 241/159 |
| 3,817,463 | 6/1974 | Krigbaum ....................... 241/152 R |
| 3,931,935 | 1/1976 | Holman .............................. 241/24 |
| 4,081,143 | 3/1978 | Johnson et al. ................... 241/29 |
| 4,156,508 | 5/1979 | Kisielewski ............ 241/DIG. 31 X |
| 4,180,004 | 12/1979 | Johnson ............................ 110/346 |
| 4,338,839 | 7/1982 | Farrel, Sr. et al. ................. 83/620 |
| 4,338,840 | 7/1982 | Farrel, Sr. et al. ................. 83/622 |

Primary Examiner—Howard N. Goldberg
Assistant Examiner—Timothy V. Eley
Attorney, Agent, or Firm—Donald W. Walk; Jack Posin

[57] ABSTRACT

An apparatus for cutting scrap tires and other waste products is disclosed. The apparatus includes a frame having a cylindrical anvil roll rotatably mounted therein. A blade roll is also mounted in the frame for rotation about an axis parallel to the rotational axis of the anvil roll, and a plurality of axially spaced roller blades of predetermined diameter are fixed to the blade roll and rotatable therewith. The blade roll is also provided with a pair of axially spaced thrust wheels, with the thrust wheels being positioned outboard of the blades and being equal to or slightly greater in diameter than the predetermined diameter of the blades. Driving means are provided in the apparatus for rotating the anvil roll and the blade roll in opposite directions in such a manner that scrap tires fed to the rolls will be drawn inwardly into the nip formed between the rolls and will be cut between the blades and the anvil. Biasing means are also provided for forcing the outer peripheries of the thrust wheels and the anvil roll into hard contact with one another to thereby maintain the spacing between the cutting surfaces of the blades and the outer surface of the anvil fixed notwithstanding the separating forces caused by the movement of a tire between such surfaces.

21 Claims, 15 Drawing Figures

Fig. 1.

SCRAP TIRE CUTTING APPARATUS

This invention relates to tire cutting apparatus and, more particularly, to an apparatus for cutting scrap rubber tires into small pieces for disposal.

BACKGROUND OF THE INVENTION

The era of the automobile has brought about significant environmental problems, one of which is represented by the ever increasing accumulation of scrap tires requiring disposal. Various proposals have been set forth for reducing or eliminating the accumulation of scrap tires such as, for example, reclaiming of the rubber in the tires as a re-usable raw material, burning of the rubber in the tires in power plants, and burying of the tires in conventional drumps and landfills.

Reclaiming of the rubber in the tires for further use as a raw material and buring of the rubber in the tires to generate power represent preferred ways of disposing of scrap tires since they recapture much of the energy originally consumed in the manufacture of the tire. However, as a necessary first step to either reclaiming the tires or burning them, the tires must be cut up into smaller pieces (e.g., rectangular chunks of 3 to 4 inches length on each side) which can be subsequently processed.

Similarly, even where tires are disposed of by burying in dumps or landfills, it is necessary to cut the old tires up into smaller pieces before burying in order to prevent the tires from working their way to the surface over a period of time.

Heretofore various proposals have been made for cutting scrap tires into small pieces, and various commercial models of tire cutting machines and shredders are available on the market. Among these devices are simple shearing mechanisms, in which one sharp-edged blade moves past another in a simple scissor action (for example, as shown in U.S. Pat. Nos. 3,578,252 to J. C. Brewer, 4,338,839 to W. M. Farrell, Sr., et al. and 4,338,840 to W. M. Farrell, Sr., et al.). Other such devices include rotary cutting apparatus wherein one set of shearing edges affixed to a rotor moves past mating, interleaved, rotary edges affixed to another, counter-rotating, parallel rotor forming a rotary scissors (as shown for example in U.S. Pat. Nos. 3,656,697 to D. J. Nelson, 3,727,850 to C. A. Krigbaum and 3,931,935 to M. A. Holman). A third type of commercially available tire cutting machine is one in which rotary cutter blades and corresponding rotary anvils rotate in face-to-face contact with each other to cut the tires therebetween (as shown in U.S. Pat. Nos. 3,817,463 to C. A. Krigbaum, 4,081,143 to A. O. Johnson et al. and 4,180,004 to A. O. Johnson).

Tire cutting devices of the type employing either the simple scissor-blade shearing action or the rotary scissor-blade shearing action, while satisfactory for cutting up thin rubberized or plastic-coated textile sheet materials, are relatively much less satisfactory for cutting heavy vulcanized tires which are assemblies of rubber, wires and cords. One reason for this is that the heavy reinforced rubber resists cutting and develops forces as a result of the shear stress, which forces tend to separate the shearing blades. The separated blades then trap rubber between them and the rubber exerts heavy frictional forces against further passage of the blade.

Thus, cutting devices based on shearing blades (both simple and rotary) can operate effectively only when the blades are sharp-edged and when tight clearances between paired blades are maintained. However, with continued use blade edges dull, tend to separate and then drag rubber between them. The separation thus produced defeats the shearing action and enormously intensifies the energy requirements needed to complete the cut. In practice the frictional forces encountered may be so high as to stop the motor or break the machine. As a result, such machines commonly have clutches or reversing gears to allow removal of the entrapped tire portions and permit a fresh cut. At best, the power requirements are very high when tire cutters of this type are employed.

An additional difficulty with tire cutters of this sort is that they fail to shear cleanly the textile cords or wires in the tires and, instead, strip rubber from such members and rupture the cords or wires by tensile breaks. The chopped pieces are then characterized by having projecting filaments of cord or wire that may extend out four or more inches from the rubber chunk. In some cases whole lengths of wire may be torn from the tire with minimal amounts of rubber attached. Chopped up tire pieces, characterized in this way, are considered unsuitable for a number of commercial uses for which cleanly chopped pieces of tire can be used.

Tire cutting machines employing cooperating rotary blades and rotary anvils represent an improvement over the simple scissor-type blade cutters and the rotary scissor-type blade cutters in that they are capable of cleanly cutting the tire carcass with low power demands and without exposure of significant amounts of projecting wire or cord.

Known forms of rotary blade/rotary anvil types of tire cutters have not been entirely satisfactory for a number of reasons. One reason is that the high compression and close blade approach required to cut tires between a rotary blade and a rotary anvil is difficult to attain and maintain due to bearing slack in the bearings supporting the rolls carrying the blades and anvils. Another reason is that in attempting to avoid the problems due to bearing slack, the rotary blades and anvils have been put into hard, pressing contact with one another, causing excessive wear on both the blades and the anvils and necessitating frequent maintenance at high costs. Alternatively, to cope with the bearing slack problem, stationary tear strip members have been employed adjacent to the rotary blades and anvils, allowing rubber to become trapped between the moving and stationary parts and thereby significantly increasing the power requirements of such devices. Yet another problem associated with the rotary blade/rotary anvil types of tire cutters relates to the design of the specific cutting edges employed on the blades, in that such blades have heretofore not been designed in such a manner as to provide long service wear and improved cutting ability.

OBJECTS OF THE INVENTION

It is, therefore, a general object of this invention to provide an improved apparatus for cutting scrap tires and other cured rubber products into smaller parts.

It is a further object of this invention to provide an improved rotary blade/rotary anvil type of tire cutting apparatus in which hard pressing contact between the knife edges of the rotary blades and the anvil roll is avoided, but in which a high force is exerted tending to keep the blades and anvils together to prevent separation of the rolls to the point where the blades will no longer cut the tires.

Yet another object of the invention is to provide a rotary blade/rotary anvil type of tire cutting apparatus in which the cutter blades are designed to give longer service than and improved cutting ability in tire cutting operations over those heretofore used.

Further objects and advantages of this invention will become apparent as the following description proceeds.

BRIEF DESCRIPTION OF THE INVENTION

Briefly stated, and in accordance with one embodiment of this invention, improved apparatus for cutting scrap tires and other waste products comprises a frame having a cylindrical anvil roll rotatably mounted therein. A blade roll is also mounted in the frame for rotation about an axis parallel to the rotational axis of the anvil roll, and a plurality of axially spaced roller blades of predetermined diameter are fixed to the blade roll and rotatable therewith. The blade roll is also provided with a pair of axially spaced thrust wheels, with the thrust wheels being positioned outboard of the blades and being equal to or slightly greater in diameter than the predetermined diameter of the blades. Driving means are provided in the apparatus for rotating the anvil roll and the blade roll is opposite directions in such a manner that scrap tires fed to the rolls from one side thereof (e.g., above) will be drawn inwardly (e.g., downwardly) by and be cut between the blades and the anvil. Biasing means are also provided for forcing the outer peripheries of the thrust wheels and the anvil roll into hard contact with one another to thereby maintain a predetermined positional relationship between the cutting surfaces of the blades and the outer surface of the anvil notwithstanding the separating forces caused by the movement of a tire between such surfaces.

By an arrangement of this type, the contact between the thrust wheels and the anvil ensures that the blades will be at all times in proper cutting relation to the anvil surface without scoring of the anvil surface and without the blades becoming dulled through excessive contact pressure. Moreover, the power requirement will be held to a minimum and effective, economic cutting of scrap tires into small pieces will be achieved.

BRIEF DESCRIPTION OF THE DRAWINGS

While the specification concludes with claims particularly pointing out and distinctly claiming the subject matter regarded as the invention herein, it is believed that the invention will be better understood from the following description taken in conjunction with the accompanying drawings, in which:

DETAILED DESCRIPTION OF THE INVENTION

Referring to the drawings, in which like reference numerals are used to denote like features in the different views, this specification will now continue with a general description of the scrap tire cutting apparatus, having reference to FIGS. 1–5, and then will follow with a detailed description of the apparatus, having reference both to FIGS. 1–5 and to the remaining figures of the drawings.

As may be seen in FIGS. 1–5, the scrap tire cutting apparatus includes a cutting assembly A at which the scrap tires are cut into pieces; a drive mechanism B for driving the rotating components of the cutting assembly A; a first conveying means C for delivering scrap tires to the cutting assembly A; a second conveying means D for removing pieces of scrap tire which have been cut by the cutting assembly A; a screen means E for receiving cut pieces of scrap tire from the second conveying means D, passing cut pieces of scrap tire of selected size therethrough and blocking the passage of larger cut pieces from passage therethrough; a third conveying means F for receiving the larger cut pieces of scrap tires from the screen means E and delivering them to the first conveying means C for recycling through the cutting assembly A; and, a fourth conveying means G for receiving the cut pieces of scrap tires of selected size from the screen means E and discharging them from the apparatus.

In operation of the apparatus, scrap tires H from a suitable source or stock pile (not shown) are loaded on to the upstream end of the first conveying means C where they are joined by the larger cut pieces J of scrap tires which have been recycled by the screen E and third conveying means F to be fed to the cutting assembly A. In the cutting assembly A, the scrap tires H are cut into large pieces J of scrap tire, while the large pieces J of scrap tire that have been recycled are cut into small pieces K of scrap tire.

The large pieces J and small pieces K of scrap tires become randomly disbursed on second conveying means D during continuous operation of the apparatus and are delivered at the downstream end of second conveying means D to the upper surface of the screen means E.

The openings in the screen of the screen means D are suitably selected (e.g., lengths and widths slightly larger than the spaces between roller blades) to allow the smaller cut pieces K to pass therethrough and out onto the fourth conveying means G but not to allow the larger cut pieces J to pass through. The larger cut pieces are then recycled through the cutting assembly A via the third conveying means F and the first conveying means C.

In the foregoing manner the scrap tire cutting apparatus provides a continual output of small pieces K at the downstream end of the fourth conveying means G of the apparatus, while providing for recycling of the larger cut pieces J to the cutting assembly A.

Referring more particularly now to FIGS. 3-6, the cutting assembly A will now be described in greater detail. Cutting assembly A includes a rotatably mounted cylindrical anvil roll 10 integral with or fixedly carried by a shaft 12 that is supported in bearings carried in bearing boxes 14 and 16 positioned at opposite sides of the anvil roll 10.

Figure 3:
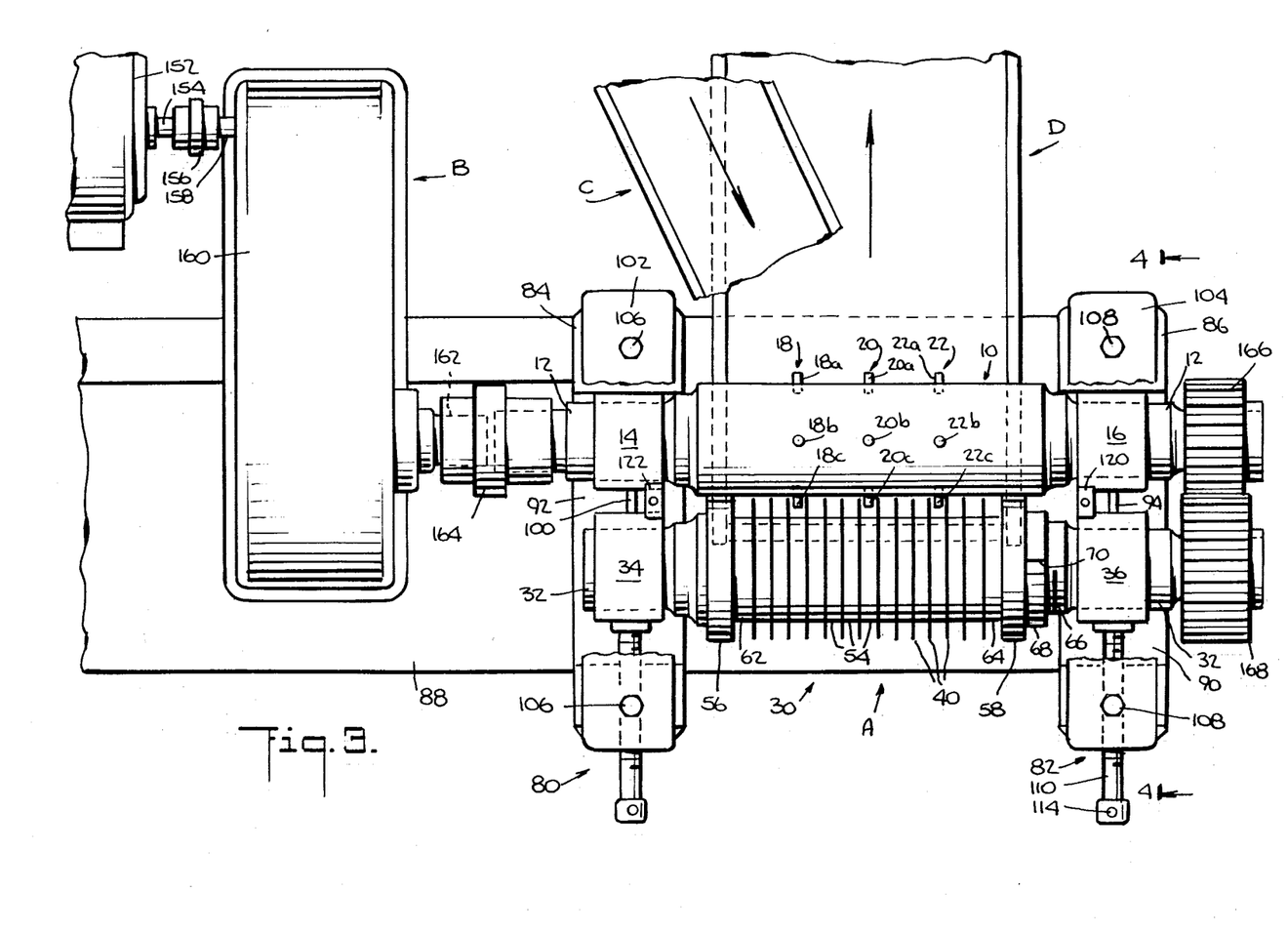
FIG. 3 is an enlarged plan view of a portion of the tire cutting apparatus of FIG. 1, showing the anvil roll, the blade roll and the drive mechanism therefor in greater detail.

The outer surface of anvil roll 10 is provided with at least one and preferably a plurality of, e.g., three, sets 18, 20, 22 of tire-engaging members in the form of pegs or hooks fixed thereto and extending radially outwardly therefrom in corresponding planes perpendicular to the rotational axis of the anvil roll. The set of pegs 18 may, for example, comprise four pegs 18a, 18b, 18c and 18d each of which is in a common plane and circumferentially spaced 90° from its next adjacent peg in that plane. Depending on the size of tires to be cut by the cutting assembly A, the number and circumferential spacing of the pegs in each set 18, 20, 22, and the number of such sets of pegs, may be varied in accordance with design considerations. The set 20 of pegs may thus include circumferentially spaced pegs 20a, 20b, 20c, and 20d, and the set 22 of pegs may thus comprise pegs 22a, 22b, 22c and 22d. Each of the pegs in sets 18, 20 and 22 are fixedly carried by the anvil roll 10 with the various pegs being fixedly mounted therein, for example by being screwed into tapped holes by known lock thread arrangements, or by being welded into holes drilled into the anvil roll, to insure that they do not work loose during operation of the apparatus.

The cutting assembly A also includes a rotatable blade roll, shown generally at 30, which is carried by a shaft 32 that is rotatably supported in bearings carried in bearing boxes 34, 36 positioned at opposite sides of the blade roll 30.

Figure 6:
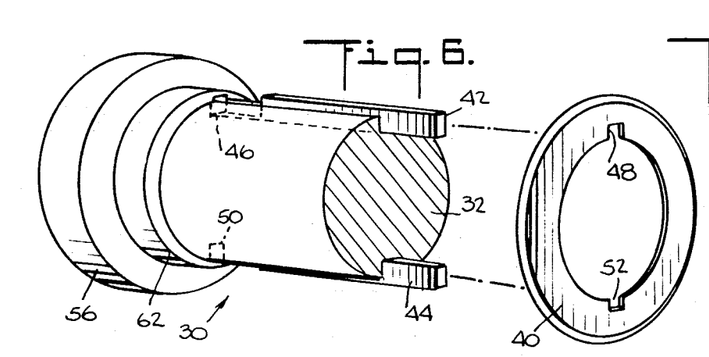
FIG. 6 is a perspective view of a portion of the blade roll, showing the manner in which roller blades are assembled to the cylindrical core of the blade roll.

Blade roll 30 is provided with a plurality of axially spaced, disc-shaped, annular roller blades 40 which are keyed to the shaft 32 for rotation therewith by means of keys 42, 44 (FIG. 6). Key 42 fits into a keyway 46 formed in the shaft 32, and engages a keyway 48 cut into the inner periphery of each of the roller blades 40. Similarly, key 44 fits into a keyway 50 on shaft 32 located 180° apart from keyway 46, and is engaged by a keyway 52 cut into each of the roller blades 40 at the inner peripheries thereof located 180° apart from the keyways 48. The various roller blades 40 are axially separated from one another by annular collars 54, each of which is provided with suitable keyways (not shown), corresponding to the keyways 48 and 52 in the roller blades 40, at 180° circumferentially spaced locations on its inner periphery.

The blade roll 30 is also provided with a pair of axially spaced thrust wheel 56, 58, one of which is located adjacent each of the outboard ends of the blade roll. Each of the thrust wheels 56, 58 is provided on its inner surface with suitable keyways (not shown), corresponding to the keyways 48 and 52 of the roller blades 40, to insure that the thrust wheels rotate in unison with the blade roll 30.

The shaft 32 of blade roll 30 is provided with a shoulder 60 against which the thrust wheel 56 is fitted, and suitable annular collars 62, 64 are provided inboard of the respective thrust wheels 56 and 58 to space the thrust wheels from the various roller blades 40. The annular collars 62 and 64 are similar in construction and features of the collars 54.

Shaft 32 is threaded at its end 66 to receive a similarly threaded spanner lock nut 68 thereon. Lock nut 68 is employed to rigidly lock the assembly of thrust wheels 56, 58, roller blades 40, and annular collars 54, 62 and 64 onto the shaft 32. The spanner lock nut 68 is provided with a groove 70 for engagement by a suitable spanner wrench (not shown) which is used to tighten up the composite assembly.

In order to insure that scrap tires which are to be cut by the cutting assembly A will be cut cleanly over a long period of time and without causing scoring of the anvil roll or damage to the roller blades, the diameters of the thrust wheels 56, 58 are made at least equal to or slightly greater in diameter than the diameter of the roller blades 40, each of which is of the same diameter as the others on the blade roll 30. Preferably, the thrust wheels 56, 58 will be in the range of 0.001 in. to 0.003 in. greater in diameter than the roller blades 40. In addition, biasing means, shown generally at 80 and 82, are employed to press the thrust wheels 56, 58 of the blade roll into hard contact with the surface of the anvil roll 10. This arrangement maintains a predetermined positional relationship between the peripheral surfaces of the roller blades and the peripheral surface of the anvil roll notwithstanding the separating forces generated therebetween due to the movement therethrough of scrap tires being cut between such surfaces. Such separating forces can add about 0.020 in. of separation between the central roller blades 40 and the anvil roll 10, due to bending of the rolls 10 and 30; however, this is acceptable and does not significantly interfere with the proper cutting action of cutting assembly A in accordance with the principles of this invention.

Figure 4:
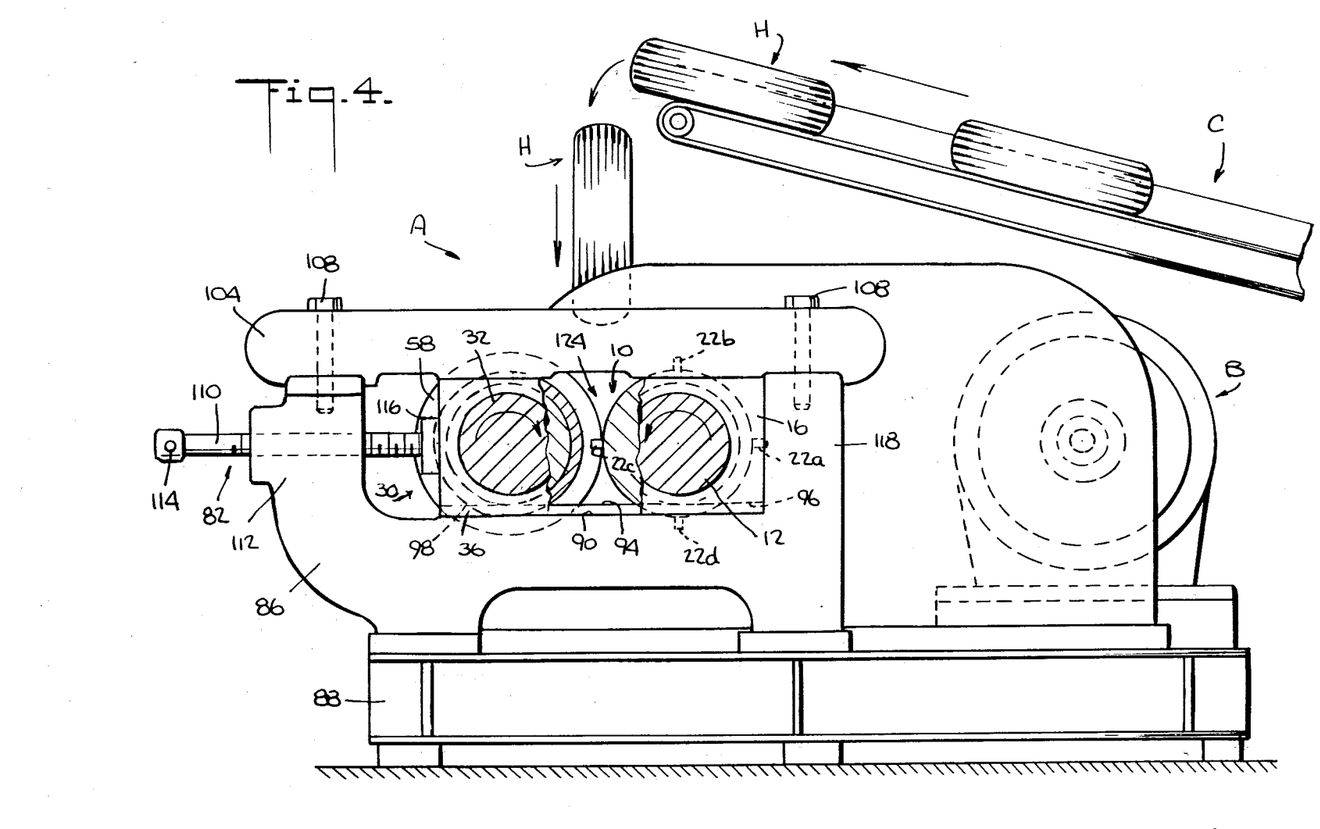
FIG. 4 is an enlarged sectional elevation view, taken along the line 4—4 of FIG. 3 and having parts cut away for clarity.
Figure 5:
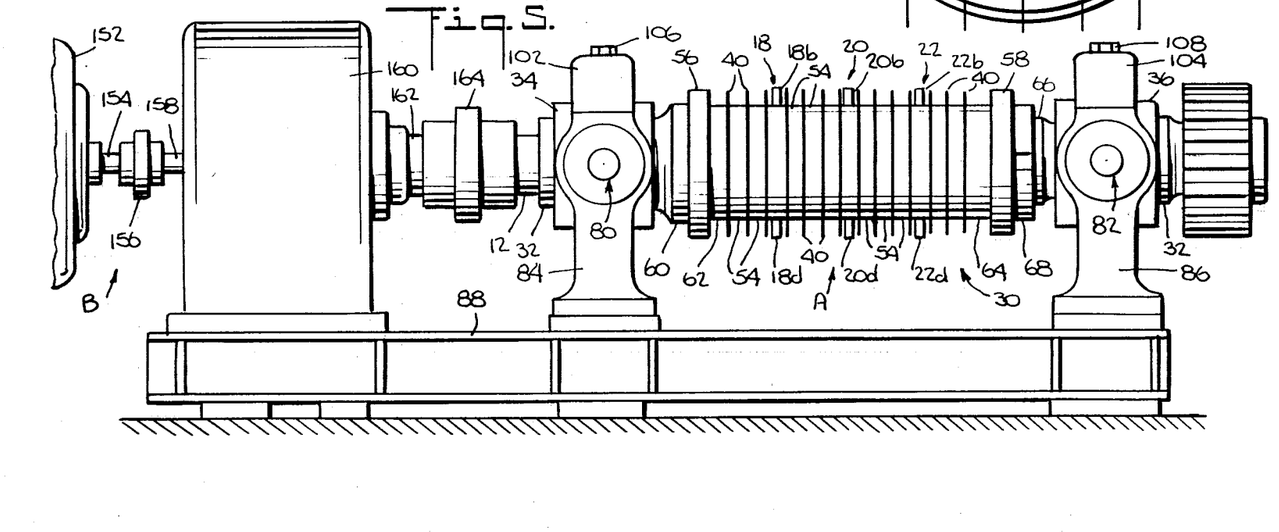
FIG. 5 is an enlarged end elevation view of the tire cutting apparatus of FIG. 1.

Referring more particularly to FIGS. 3 and 4, the bearing boxes 14, 16 of anvil roll 10 and the bearing boxes 34, 36 of blade roll 30 are supported in upstanding pedestals 84, 86 carried by a base plate 88 which, together with the upstanding pedestals 84, 86, forms the frame for the cutting mechanism A. The right-hand (as viewed in FIG. 3) bearing box 16 of anvil roll 10 and the right-hand bearing box 36 of blade roll 30 are adjustably positioned in a cut-out portion or slide 90 of pedestal 86, while the left-hand bearing box 14 of anvil roll 10 and the left-hand bearing box 34 of blade roll 30 are adjustably positioned in a similar cut-out portion or slide 92 of pedestal 84.

In order to prevent side-wise or axial movement of the bearing boxes 16 and 36 with respect to pedestal 86, the slide 90 thereof is provided with a raised rib 94 (FIG. 4) which is engaged by mating profiled grooves 96, 98 in bearing boxes 16 and 36, respectively, and slide 92 of pedestal 84 (FIG. 3) is provided with a raised rib 100 that is engaged by similar grooves (not shown) in the bearing boxes 14 and 34.

Pedestal caps 102 and 104 are positioned atop the pedestals 84 and 86, respectively, to prevent the bearing boxes 14, 34 (in the case of pedestal 84 and pedestal cap 102) and bearing boxes 16, 36 (in the case of pedestal 86 and pedestal cap 104) from moving vertically at their respective adjusted positions on slides 92 and 90. Pedestal cap 102 is fastened to pedestal 84 by means of hold-down bolts 106, and pedestal cap 104 is fastened to pedestal 86 by means of hold-down bolts 108. The vertical spacing between the upper surface of slide 90 and the lower surface of pedestal cap 104 is so selected as to provide about 0.002 in. of clearance between the lower surface of pedestal cap 104 and the tops of bearing boxes 16 and 36 in order to allow the bearing boxes to be moved along slide 90 by the biasing means 82 when hold-down bolts 108 have been tightened down. A similar spacing arrangement is employed between pedestal cap 102 and slide 92, for similar reasons.

Referring to FIG. 4, the manner in which the biasing means 82, 84 are employed to force the blade roll 30 toward the anvil roll 10 to bring the outer peripheries of the anvil roll and the thrust wheels 56, 58 of the blade roll 30 into hard contact with one another will now be considered in greater detail. Only the right-hand biasing means 82 will be discussed in detail herein; however, it will be understood that the left-hand biasing means 80 is constructed and arranged in a similar manner to biasing means 82 and performs similar functions with respect to the left-hand side (FIG. 3) of the cutting assembly A.

Biasing means 82 includes an adjusting screw 110 which is threadedly mounted in and passes through one (the left, as viewed in FIG. 4) leg 112 of pedestal 86. One (the left) end of screw 110 is provided with an enlarged head having an opening 114 therethrough into which a crow bar or other rod-like implement may be inserted in order to rotate screw 110 in the threaded bore of pedestal leg 112. The opposite end of screw 110 rotatably engages and carrys a pressure pad 116 which bears against bearing box 36.

In order to set up the cutting assembly A for operation, the slack in the bearings in each of the bearing boxes 16 and 36, which slack amounts to about 0.0045 in. in each of the bearings, must be taken up by the biasing means 82. This is done to prevent the roller blades 40 from moving away from the surface of anvil roll 10, which movement would cause poor cutting of scrap tires in the cutting assembly A. The slack is taken up by turning the adjusting screw 110 to axially advance the screw 110 and pressure pad 116 against the bearing box 36. As viewed in FIG. 4, this first causes bearing box 36 to move to the right, taking the slack out of that bearing box, and then causes shaft 32 of blade roll 30 to move to the right, forcing thrust wheel 58 into hard contact with the outer periphery of anvil roll 10. Next, shaft 12 of anvil roll 10 presses against the right side of bearing box 16, taking the slack out of the bearing in that bearing box, and, finally, bearing box 16 moves to the right into hard contact with the left vertical surface of the back leg 118 of pedestal 86.

In actual practice, feeler gages (not shown) are employed in setting up the initial positioning of anvil roll 10 and blade roll 30 in the cutting assembly A. One feeler gage is positioned between the inner surface of the bearing box 36 and the shaft 32 carried therein, at the vertical level of the axis of the shaft, and another feeler gage is inserted between the inner wall of the bearing box 16 and the shaft 12 at the vertical level of the axis of shaft 12. The adjusting screw 110 is then turned to move the bearing boxes toward the back leg 118 until each of the feeler gages show that the slack of 0.0045 in. has been taken up. At that point, a third feeler gage is inserted between the two bearing boxes to measure the spacing therebetween, and then a spacer member 120 (FIG. 3), having a thickness equal to the spacing between the bearing boxes 16 and 36, is cut to size. A similar spacer member 122 is prepared in a similar manner for insertion between the bearing boxes 14 and 34 of pedestal 84.

After the spacers 120 and 122 have been prepared, the adjustment screws 110 are backed off, the various feeler gages are removed, and the spacer members 120, 122 are inserted between their corresponding bearing boxes. Then the adjusting screws 110 are re-tightened sufficiently to cause the bearing box 36 to be pressed into hard contact with spacer member 120, the spacer member 120 to be pressed into hard contact with the bearing box 16, and the bearing box 16 to be pressed into hard contact with the inner surface of the back leg 118 of the pedestal. Similarly, the bearing box 34 will be pressed into hard contact with the spacer member 122, which will be pressed into hard contact with the bearing box 14, and the latter will be pressed into hard contact with the inner surface of the back leg of pedestal 84. At the same time, the thrust wheels 56 and 58 of blade roll 30 will be pressed into hard contact with the outer surface of the anvil roll 10, insuring that the roller blades 40 are properly positioned with respect to the surface of anvil roll 10 for cutting tires in the cutting assembly A.

When so properly positioned, the roller blades 40 and the outer surface of anvil roll 10 are in tangential contact, or substantially so, forming a nip, shown generally at 124, through which scrap tires H are passed during the cutting operation of cutting assembly A.

Since the slack has been removed from the bearings supporting blade roll 30 and anvil roll 10, the preset positional relationship of the blades and the anvil roll is maintained during the cutting operation without separation of the blades from the anvil roll (other than by acceptable bending of the rolls) and without scoring of the anvil roll by the blades or vice versa.

Figures 12, 13:
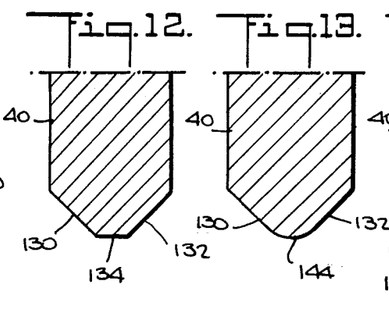
FIGS. 12–14 are enlarged detailed sectional elevation views of the outer peripheral portions of various configurations of roller blades that may be used in the scrap tire cutting apparatus of FIG. 1.

Referring now to FIG. 12, the peripheral portion of a preferred blade to be used as roller blade 40 has been illustrated. The peripheral portion of the blade 40 is preferably provided with inclined sides 130, 132 which are interconnected at their radially outer ends by a peripheral flat portion 134 which is in the form of a right cylinder coaxial with the rotational axis of the roller blade. The peripheral portion 134 is positioned radially inwardly of the apparent point of intersection of the inclined sides 130, 132, the arrangement being such as to form a blunt-tipped roller blade.

The included angle between the inclined sides 130, 132 is preferably about 90° but it has been found that such included angle may be any angle greater than 60° but less than 135° and still perform satisfactorily as a roller blade in this invention.

Figure 8:
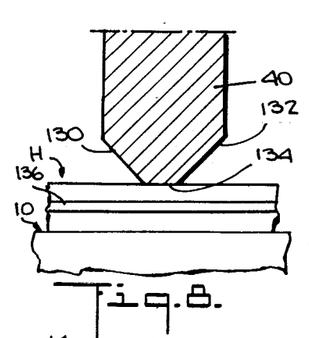
FIGS. 8 and 9 are enlarged sectional elevation views of portions of a roller blade and the anvil roll, illustrating the manner in which a scrap tire is cut by the apparatus during its passage therethrough.
Figure 9:
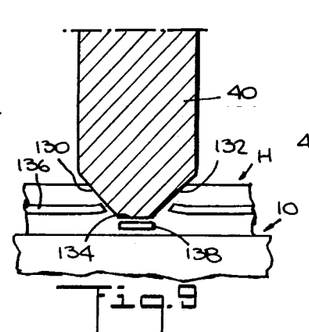

Referring to FIGS. 8 and 9 which respectively show a portion of a tire H approaching the nip between a roller blade 40 and the outer surface of the anvil roll 10, and a portion of a tire H in the nip between the roller blade 40 and anvil 10, one theory of the manner in which blunt-tipped roller blades are able to function in a gang to slice tires up into strips and pieces will now be considered.

As the roller blade 40 and anvil roll 10 rotate toward each other, they pin a portion of a tire H between them. Under the flattened portion 134 of the blade, a high compression stress rapidly develops, constraining the vulcanized rubber to flow out from underneath the blade. Because of the vulcanization network, the rubber so distorted is under very large unrelieved stress which effectively stiffens it and permits the wire 136 in the tire to be sheared off wholly within the rubber, without contact of either the roller blade or the anvil roll, as shown in 138 in FIG. 9. According to this rationale, the wire 136 is cut on either side of the right cylindrical portion 134 of the blade. In practice, very short cut segments of wire 138 have been found to have been cut out from the longer wire 136, with the segment length corresponding to the width of the right cylindrical portion 134. These short cut segments of wire have been found in the output of the cutter assembly A with the segments usually having sharply sheared edges, as shown at 140 in FIG. 10, or, occasionally, flattened or flared edges, as shown at 142 in FIG. 11, but in each case with an undeformed cylindrical mid-portion.

If an attempt is made to cut the same wire 136 (FIG. 8) when it is encased in unvulcanized, or lightly vulcanized rubber, the rubber is simply extruded out from beneath the wires, in a relaxed state, and the roller blade 40 merely flattens and crushes, but does not sever, the wire. It is, thus, quite striking to find that the blunt-tipped circular roller blades 40 of this invention are able to function in a gang to slice vulcanized tires into strips and pieces, while the same arrangement is relatively ineffective against the same array of wires and/or textiles which are not imbedded in a matrix of vulcanized rubber.

A particular virtue of the cutting scheme employed in this invention, when applied to vulcanized tires, is that the cutting forces are symmetrical (unlike a shears) and do not tend to strip rubber from the textile or wire filaments.

Another advantage of the invention is that it enables the cutting of tires without having the blade edge and the anvil in contact with one another. A separation of several thousandths of an inch does not prevent a clean cut of the tire section. It is believed that the blade angles employed for the inclined sides 132, 134 provide sufficient separating force to rupture the last then film of rubber interposed between the blade and the anvil while avoiding hard, wearing contact between the counter-rotating blade and anvil rolls.

Figure 14:
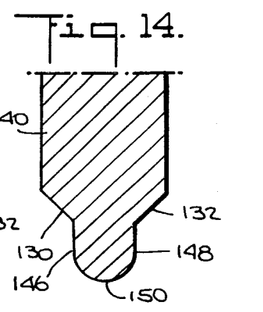

Referring to FIGS. 12-14, there have been illustrated various embodiments that the peripheral portion of the roller blades 40 may take while still giving satisfactory operation within the scope of this invention. Preliminarily, it had been found that sharply ground cutting edges (i.e., those in which the inclined sides 130, 132 of FIG. 12 come to a point), within the suitable angle ranges of greater than 60° to less than 135°, tended to dull rapidly, or to chop, and required frequent sharpening to ensure that the whole gang of blades were of the same diameter and in close proximity to the anvil roll. This led to the interesting and surprising discovery that flat-edged blades of the type shown in FIG. 12 were quite effective and cut tires more satisfactorily than their more acutely sharpened counterparts, at equivalent included angles of the inclined sides 130, 132. The width of the flat portion 134 is preferably in the range of 3/64 in. to ¼ in. on a roller blade 40 having a total width of about ½ in.

Referring to FIGS. 13 and 14, it has been found that blades with fully rounded edges also perform well as roller blades 40. Thus, the peripheral portion of roller blade 40 may, as in FIG. 13, have inclined sides 130, 132 interconnected by a circular arc 144, which arc may have a radius of, for example, about ⅛ in. SImilarly, the peripheral portion of the roller blade 40 may, as in FIG. 14, have inclined sides 130, 132 interconnected by short, straight-sided blade portions 146, 148 and a circular arc 150, which arc, again, may have a radius of about ⅛ in.

Figure 1:
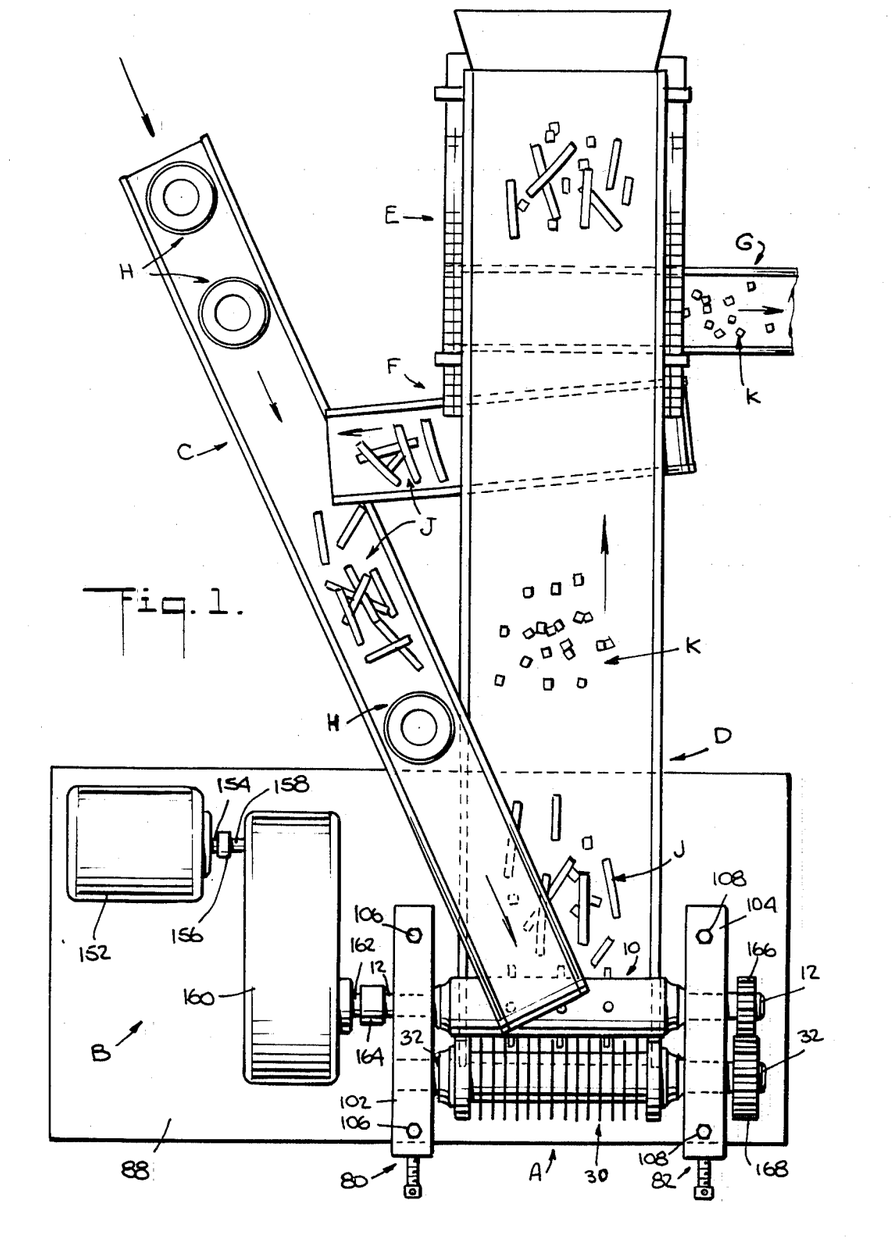
FIG. 1 is a plan view, with portions cut away for clarity, of a preferred scrap tire cutting apparatus in accordance with this invention.
Figures 2, 10, 11:
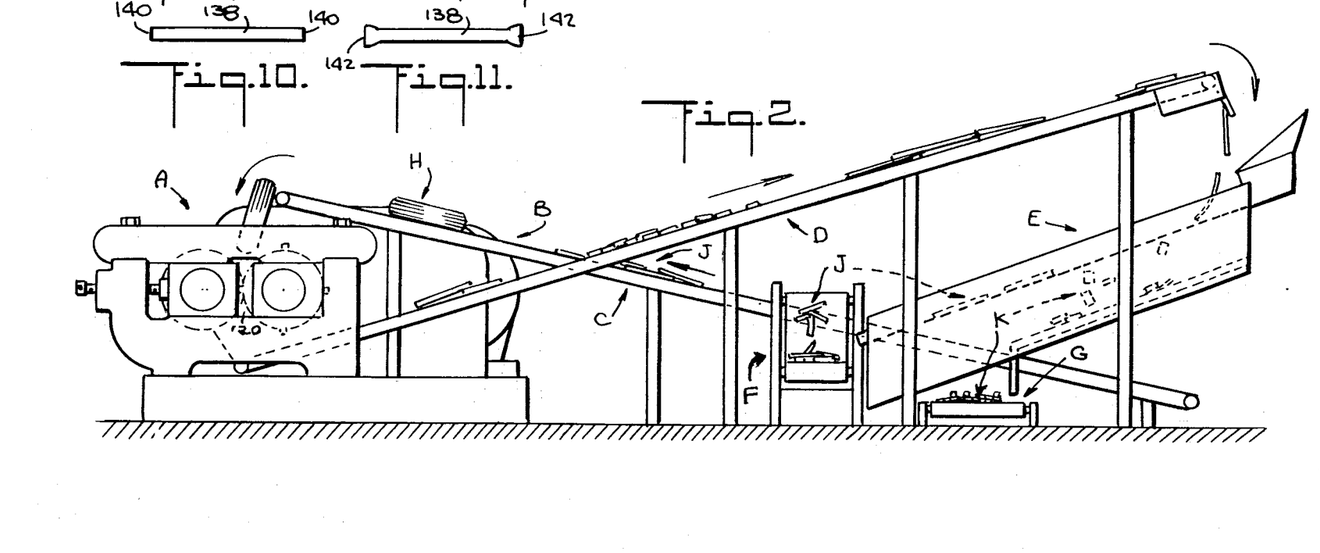
FIG. 2 is a side elevation view, with portions cut away for clarity, of the scrap tire cutting apparatus of FIG. 1.
FIGS. 10 and 11 are detailed views of pieces of wire that have been cut from a scrap tire during passage of the tire between a roller blade and the anvil roll of FIGS. 8 and 9.

Referring now to FIGS. 1 and 3, the drive mechanism B, which serves to rotate anvil roll 10 and blade roll 30 in opposite directions, will now be described in greater detail.

Drive mechanism B includes a drive motor 152 the output shaft 154 of which is coupled by means of a coupling unit 156 to the input shaft 158 of a reduction gear mechanism 160. Reduction gear mechanism 160 includes an output shaft 162 which is coupled by means of a coupling unit 164 to one end of the shaft 12 of anvil roll 10. The other end of shaft 12 has a gear 166 keyed thereto so that gear 166 rotates in unison with shaft 12 and serves as a drive gear for a second gear 168 which is keyed onto an end of the shaft 32 of blade roll 30. The gearing teeth relationship between gears 166 and 168 is proportional to the diameters of the anvil roll 10 and blade roll 30 so that during rotation the peripheral surface speeds of the two rolls are substantially equal, although slight variations in speed can be tolerated without ill effect. A suitable safety shield (not shown) may be employed to enclose the gears 166, 168 to avoid injury to workers in the area.

Referring to FIG. 4, it will be noted that incoming tires H delivered to cutting assembly A by conveying means C are released from the downstream end of the conveying means at a point above the nip 124 of the cutting assembly and fall by gravity into the nip. Recycled strips J (FIG. 1) are also dropped from the downstream end of conveying means C into the nip 124, and the rotational speeds of the rolls 10 and 30 are so selected that the peripheral speeds of the rolls are less than the velocity of the falling strips J at the time that the strips come into contact with the rolls. As a result of this, those of the strips J which arrive at the nip in an end-wise, rather than in a side-wise, orientation tend to fall over onto their sides, allowing them to be cut into small rectangular or rhomboidal-shaped pieces during their second or any subsequent pass through the cutting assembly A.

The conveying means C, D, F and G, and the screen E, are conventional pieces of equipment that are commonly available in the marketplace. Accordingly, they need not be further described herein.

Figure 7:
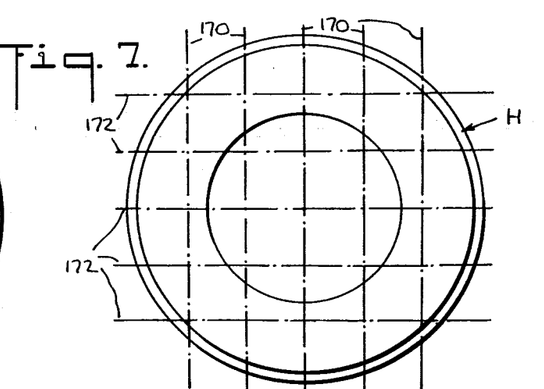
FIG. 7 is a plan view of a scrap tire having broken lines superimposed thereon to illustrate the manner in which the tire is cut into generally rectangular parts after passing through the tire cutting apparatus of FIG. 1.

Referring to FIG. 7, a scrap tire H has been shown therein, in plan, together with superimposed broken lines 170, which represent the cuts made in the scrap tire during its initial passage through the cutting assembly A, and superimposed broken lines 172, which represent the cuts made to the tire during the recycling passage of the cut strips J through the cutting assembly A.

Figure 15:
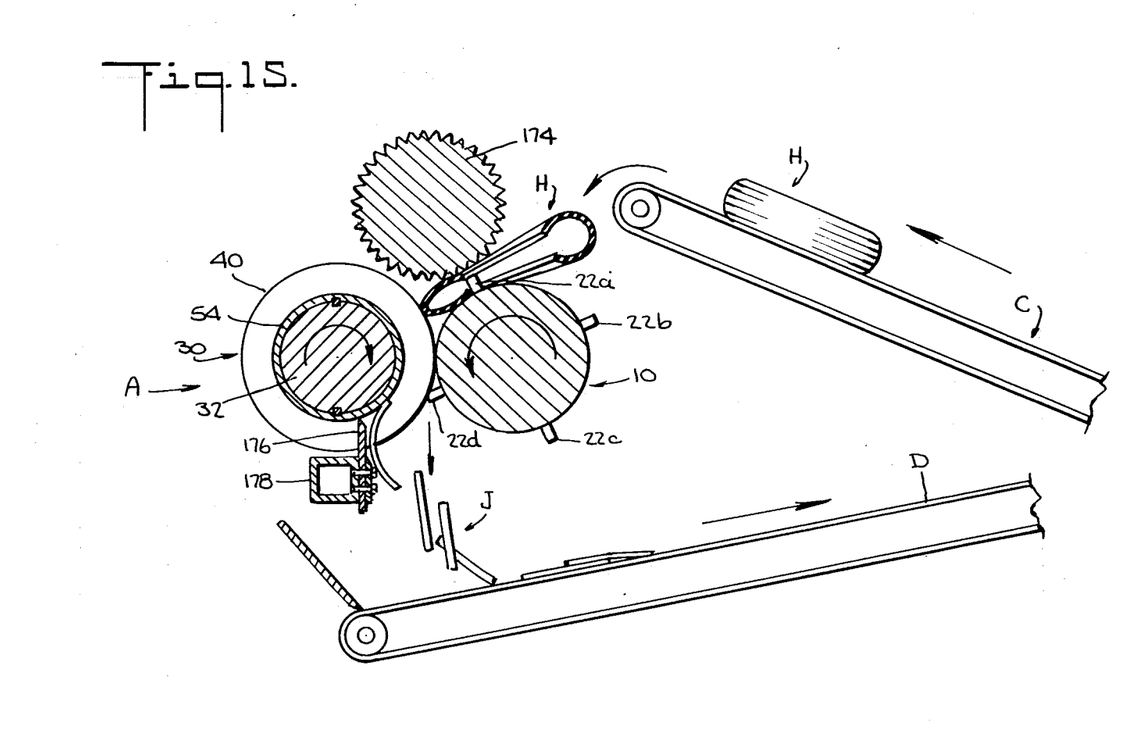
FIG. 15 is an enlarged sectional elevation view, similar to FIG. 2, showing an alternative form of the scrap tire cutting apparatus, in which a feed roll is employed in conjunction with the anvil roll and the blade roll for feeding scrap tires into the nip between the latter two rolls, and scraper bars are employed to dislodge cut pieces of scrap tire from between the roller blades during operation of the apparatus.

Referring now to FIG. 15, there has been illustrated a modification of the invention in which a corrugated feed roll 174 is employed in conjunction with the anvil roll 10 and the pegs 22a-22d to feed scrap tires H into the nip 124 between the blade roll 30 and the anvil roll 10. The corrugated feed roll 174 is carried by the frame of the apparatus at a position that is adjacent to anvil roll 10 so that the currugated feed roll will compress the tires H against the pegs 22a–22d thereby to insure positive feeding of the tires even when they are wet and slippery. Corrugated feed roll 174 is preferably driven by a take-off gear train (not shown) which is coupled to the drive gear 166 (FIG. 3) on shaft 12 of the anvil roll 10.

As also shown in FIG. 15, cutting apparatus A may be provided with a plurality of scaper bars, one of which is shown at 176, supported on a transverse beam 178 that is carried by the frame of the apparatus beneath blade roll 30. The scraper bars 176 extend upwardly from beam 178 into the spaces between the roller blades 40 and serve to remove any cut strips J, or other pieces of cut tire, that may have become wedged between the blades during passage of the scrap tires and such strips or other pieces of tire through the nip 124.

From the foregoing description, it will be seen that this invention provides a scrap tire cutting apparatus which, with low power demands, cuts scrap tires cleanly and neatly into strips and pieces, without exposure of significant amounts of projecting wire or cord on the pieces. The invention provides for use of roller blades which are highly effective and long-wearing and utilizes an arrangement which minimizes scoring of the anvil roll and damage to the blades since the apparatus is capable of functioning properly and cleanly cutting the tire sections notwithstanding a separation of several thousandths of an inch between the roller blades 40 and the surface of anvil roll 10.

While there have been shown and described what are at present considered to be the preferred embodiments of this invention, it will be obvious to those skilled in the art that various changes and modifications may be made therein without departing from the broader aspects of this invention, and it is, therefore, aimed in the appended claims to cover all such changes and modifications as fall within the true spirit and scope of this invention.

Having thus described the invention, what is claimed as new and desired to be protected by Letters Patent of the United States of America is:

1. Apparatus for cutting scrap tires, comprising:
   (A) a frame;
   (B) a cylindrical anvil roll mounted in said frame for rotation about its longitudinal axis;
   (C) a blade roll mounted in said frame for rotation about an axis parallel to the rotational axis of said anvil roll;
   (D) a plurality of axially spaced roller blades of predetermined diameter fixed to said blade roll and rotatable therewith so that said blades and said anvil roll define a nip therebetween into which tires to be cut can be drawn,
   (E) a pair of axially spaced thrust wheels carried by said blade roll,
      (1) said thrust wheels being positioned outboard of said roller blades,
      (2) said thrust wheels being at least equal in diameter to said predetermined diameter of said roller blades;
   (F) drive means for rotating said rolls in opposite directions to draw scrap tires into the nip between said roller blades and said anvil roll; and
   (G) biasing means constructed and arranged to force one of said rolls relatively toward the other of said rolls to bring the outer peripheries of said anvil roll and said thrust wheels into hard contact with one another, thereby to maintain a predetermined positional relationship between the peripheral surfaces of the roller blades and the peipheral surface of the anvil roll notwithstanding the separating forces generated therebetween due to the movement therethrough of scrap tires being cut between such surfaces.

2. Apparatus as described in claim 1 wherein said roller blades comprise disc-like members the radially outer portions of which, in cross-section, are formed at least in part by inclined sides which form an included angle with each other of greater than 60° but less than 135°.

3. Apparatus as described in claim 2 wherein said inclined sides form an included angle with each other of about 90°.

4. Apparatus as described in claims 2 or 3 wherein said inclined sides are interconnected at their radially outer ends by a peripheral portion which is positioned radially inwardly of the apparent point of intersection of said inclined sides.

5. Apparatus as described in claim 4 wherein said peripheral portion is in the form of a right cylinder coaxial with the rotational axis of said blade roll.

6. Apparatus as described in claim 5 wherein said right cylindrical peripheral portion has an axial length in the range of 3/64 in. to ¼ in.

7. Apparatus as described in claim 4 wherein said peripheral portion is arcuate in shape.

8. Apparatus as described in claim 1 wherein said roller blades comprise disc-like members the radially outer peripheral portions of which are in the form of a pair of axially spaced, oppositely disposed, coaxial conic sections of substantially equal radius interconnected by an annular protrusion having an arcuate outer surface, the radially outermost portion of which outer surface has a diameter which is equal to said predetermined diameter.

9. Apparatus as described in claim 1 wherein the outer diameter of each of said thrust wheels is equal to the outer diameter of each of said roller blades.

10. Apparatus as described in claim 1 wherein the outer diameter of each of said thrust wheels is greater than the outer diameter of each of said roller blades.

11. Apparatus as described in claim 1 wherein said drive means rotates said anvil roll and said blade roll at equal peripheral speeds.

12. Apparatus as described in claim 1 wherein said thrust wheels are fixedly carried by said blade roll for rotation with said blade roll.

13. Apparatus as described in claim 1 wherein said rotary blades comprise disc-like members, and wherein said cylindrical anvil roll is provided with at least one set of tire-engaging members fixed thereto and extending radially outwardly therefrom in a plane perpendicular to the rotational axis of said anvil roll, each of said sets being in a corresponding one of said planes, said members passing between the axially spaced roller blades of said blade roll during rotation of said rolls and serving to aid in drawing scrap tires into the nip between said roller blades and said anvil roll.

14. Apparatus as described in claim 13 and further including a plurality of scraper bars carried by said frame below said blade roll and extending upwardly into the axial spaces between said roller blades to dislodge cut pieces of scrap tire from between said blades during operation of said apparatus.

15. Apparatus as described in claim 13 and further including a feed roll mounted in said frame for rotation about a longitudinal axis parallel to the rotational axis of said anvil roll, said feed roll being rotated by said driving means and being spaced from and cooperative with said anvil roll to feed scrap tires into the nip between said anvil roll and said blade roll.

16. Apparatus as described in claim 15 wherein said feed roll is provided with a corrugated peripheral surface.

17. Apparatus as described in claim 1 and further including bearing means carried by said frame adjacent opposite ends of said blade roll for rotatably supporting said blade roll in said frame, said bearing means being movable relative to said frame to facilitate movement of said blade roll toward and away from said anvil roll.

18. Apparatus as described in claim 17 wherein said biasing means comprises screw means threadedly mounted in said frame adjacent each of said bearing means, each of said screw means having one end thereof engageable with a corresponding one of said bearing means for moving said bearing means relative to said frame thereby to move the outer peripheral surfaces of the thrust wheels of said blade roll into hard contact with the outer peripheral surface of the anvil roll.

19. Apparatus as described in claim 1 and further including a plurality of scraper bars carried by said frame below said blade roll and extending upwardly into the axial spaces between said roller blades to dislodge cut pieces of scrap tires from between said blades during operation of said apparatus.

20. Apparatus as described in claim 1 and further including a first conveying means for delivering scrap tires to a point adjacent to the nip between said anvil roll and said blade roll; a second conveying means for receiving pieces of scrap tire which have been cut between said anvil roll and said blade roll; screen means for receiving said cut pieces of scrap tire from said second conveying means, passing cut pieces of scrap tire of selected sizes therethrough and blocking the passage of larger cut pieces from passage therethrough; third conveying means for receiving said larger cut pieces of scrap tires from said screen means and delivering them to said first conveying means for receiving said cut pieces of scrap tire of selected sizes and discharging them from said apparatus.

21. Apparatus as described in claim 1 wherein the diameter of said thrust wheels exceeds said predetermined diameter of said roller blades by an amount in the range of from 0.001 in. to 0.003 in.

* * * * *